United States Patent
Li et al.

(10) Patent No.: US 10,031,210 B2
(45) Date of Patent: Jul. 24, 2018

(54) RADAR DEVICE AND METHOD OF OPERATING A RADAR DEVICE

(71) Applicants: Hao Li, Poing (DE); Yi Yin, Munich (DE)

(72) Inventors: Hao Li, Poing (DE); Yi Yin, Munich (DE)

(73) Assignee: NXP USA, Inc., Austin, TX (US)

( * ) Notice: Subject to any disclaimer, the term of this patent is extended or adjusted under 35 U.S.C. 154(b) by 401 days.

(21) Appl. No.: 14/778,097

(22) PCT Filed: Mar. 21, 2013

(86) PCT No.: PCT/IB2013/052238
§ 371 (c)(1),
(2) Date: Sep. 18, 2015

(87) PCT Pub. No.: WO2014/147445
PCT Pub. Date: Sep. 25, 2014

(65) Prior Publication Data
US 2016/0069986 A1   Mar. 10, 2016

(51) Int. Cl.
*G01S 7/03* (2006.01)
*G01S 13/34* (2006.01)
*G01S 13/93* (2006.01)

(52) U.S. Cl.
CPC ............. *G01S 7/036* (2013.01); *G01S 7/034* (2013.01); *G01S 13/34* (2013.01); *G01S 13/931* (2013.01)

(58) Field of Classification Search
CPC .......... G01S 7/032; G01S 7/034; G01S 7/036; G01S 13/34; G01S 13/931; H03H 7/48;
(Continued)

(56) References Cited

U.S. PATENT DOCUMENTS 5,045,822 A   9/1991  Mohwinkel
5,072,199 A   12/1991 Furlow
(Continued)

FOREIGN PATENT DOCUMENTS

JP   2012-194036   10/2012

OTHER PUBLICATIONS

International Search Report and Written Opinion correlating to PCT/IB2013/052238 dated Dec. 12, 2013.
(Continued)

*Primary Examiner* — Peter M Bythrow
*Assistant Examiner* — Daniel P Malley, Sr.
(74) *Attorney, Agent, or Firm* — Charlene R. Jacobsen

(57) ABSTRACT

A radar device includes a RF signal source, two or more antenna interface units, a feed network, and a control unit. The RF signal source is arranged to provide a RF signal; each of the antenna interface units includes an antenna port and one of the following: an amplifier and a mixer; the feed network includes two or more buffers, each buffer has an active and an inactive state; the control unit is arranged to generate or receive a selection signal which specifies none, one, or more of the antenna interface units as active antenna interface units and the remaining antenna interface units as inactive antenna interface units; the control unit is arranged to activate and deactivate the buffers in dependence on the selection signal so as to feed the RF signal to the none, one, or more active antenna interface units and not to the inactive antenna interface units.

11 Claims, 5 Drawing Sheets

(58) Field of Classification Search
CPC ........ H03H 7/482; H03H 7/485; H03H 7/487; H01Q 3/24; H01Q 3/247; H01Q 3/22; H01Q 3/26; H01Q 3/2623
See application file for complete search history.

(56) References Cited

U.S. PATENT DOCUMENTS

| | | | |
|---|---|---|---|
| 6,054,948 A | 4/2000 | Dean | |
| 7,502,631 B2* | 3/2009 | Hashemi | H01Q 3/22 455/273 |
| 7,728,753 B2* | 6/2010 | Taft | H03M 1/0624 341/165 |
| 8,289,083 B2* | 10/2012 | Menon | H01Q 3/26 330/252 |
| 8,947,293 B2 | 2/2015 | Hayase | |
| 9,843,255 B1 | 12/2017 | Goumballa et al. | |
| 2007/0182501 A1 | 8/2007 | Saito et al. | |
| 2008/0084346 A1 | 4/2008 | Minichshofer et al. | |
| 2008/0278370 A1 | 11/2008 | Lachner et al. | |
| 2010/0259312 A1 | 10/2010 | Menon et al. | |
| 2010/0261440 A1* | 10/2010 | Corman | H01Q 3/26 455/91 |
| 2012/0235859 A1 | 9/2012 | Hayase | |
| 2016/0245898 A1* | 8/2016 | Li | G01S 7/032 |
| 2017/0358329 A1 | 12/2017 | Goumballa et al. | |
| 2017/0359108 A1 | 12/2017 | Abdel Khalek et al. | |

OTHER PUBLICATIONS

May, Jason W. and Rebeiz, Gabriel M., "A 40-50GHz SiGe 1 : 8 Differential Power Divider Using Shielded Broadside-Coupled Striplines," IEEE Transactions on Microwave Theory and Techniques, vol. 56, No. 7, Jul. 2008.

May, Jason W. and Rebeiz, Gabriel M., "A 30-40 GHz 1:16 Internally Matched SiGe Active Power Divider for Phased Array Transmitters," IEEE 2007 Custom Integrated Circuits Conference (CICC), 2007.

Marsh, S.P. "MMIC Power Splitting and Combining Techniques," The Institution of Electrial Engineers, 1997.

U.S. Appl. No. 15/698,916, filed Sep. 8, 2017; 40 pages; not yet published.

U.S. Appl. No. 14/707,179, filed May 8, 2015; 23 pages; not yet published.

* cited by examiner

RADAR DEVICE AND METHOD OF OPERATING A RADAR DEVICE

FIELD OF THE INVENTION

This invention relates to a radar device and method of operating a radar device.

BACKGROUND OF THE INVENTION

Millimeter wave radar devices find increasing use in e.g., automobile applications. A radar system may generally comprise a transmitter for emitting a radar signal and a detector for receiving and analyzing a reflected part of the radar signal. The expression "radar device" as used herein, may refer to a transmitter section or a detector section or a combination of both of a radar system. A radar system may comprise multiple antennas for improving the accuracy of a map of objects produced by the radar system. The antennas may, for example, be operated sequentially.

An example of a radar transmitter device 10 is shown in FIG. 1. The radar device 10 may comprise a radar frequency (RF) signal source 12, a feed network 13, two or more power amplifiers 14, 16, and a corresponding set of antennas 22, 24. The signal source 12 may, for example, comprise an oscillator core, e.g., a VCO (voltage-controlled oscillator). The RF signal may have a frequency higher than e.g., ten gigahertz or even higher than, e.g., seventy six gigahertz. The radar device 10 may further comprise a control unit 15 for activating and deactivating selected ones of the power amplifiers 14, 16. A control unit 15 may, for example, receive or generate a selection signal (SEL) for specifying either a first transmission channel associated with, e.g., the first transmission antenna 22 or a second transmission channel associated with, e.g., the second transmission antenna 24. For example, when the first antenna 22 has been selected for transmission, the control unit 15 may switch the first power amplifier 14 on and the second power amplifier 16 off. As a consequence, the first transmission antenna 22 may be provided with an amplified radar frequency signal by the first power amplifier 14, while the second transmission antenna 24 will be provided with no signal from the second power amplifier 16 in an ideal scenario.

In practice, however, there may be so-called crosstalk or a leakage signal, due to limited isolation of the power amplifier in the microwave and millimeter-wave frequency range and electromagnetic (EM) coupling of passive elements between the antennas 22, 24. That is, a portion of the radar frequency (RF) signal may travel to the second antenna 24 via, e.g., the feed network 13 and also a portion of the amplified radar frequency output signal by the first power amplifier 14 may travel to the second antenna 24 via, e.g. coupling, and be transmitted by the second antenna 24, although in this example only the first antenna 22 is selected as the active one. The power level difference or power suppression between two antenna ports when one antenna is on and another one is off can be an essential parameter for the system performance.

Turning now to FIG. 2, an example of a radar receiver device 10 is shown. The basic structure of the receiver device may be similar to the transmitter device 10 described above in reference to FIG. 1. The present radar device 10 may comprise a signal source 12, e.g., a local oscillator (LO) connected to two or more mixers 14, 16 via a feed network 13. The mixers 14, 16 may each be connected to a corresponding reception antenna 22, 24. Each mixer, e.g., mixer 14 may be arranged to mix the radar frequency signal from the signal source 12 with a reception signal received from the corresponding antenna, e.g., the first antenna 22, to generate an intermediate frequency (IF) signal which may then be further processed and analyzed. Each of the mixers 14, 16 may comprise an amplifier (not shown), e.g., a low noise amplifier, for amplifying the reception signal received by the corresponding antenna. A control unit 15 may be provided to activate or deactivate a selected one of the mixers 14, 16, thereby selecting one of the antennas 22, 24 as an active antenna. However, crosstalk between the two branches 14, 22, and 16, 24 may deteriorate the quality of the intermediate frequency signal generated by the active branch.

SUMMARY OF THE INVENTION

The present invention provides a radar device and method of operating a radar device as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
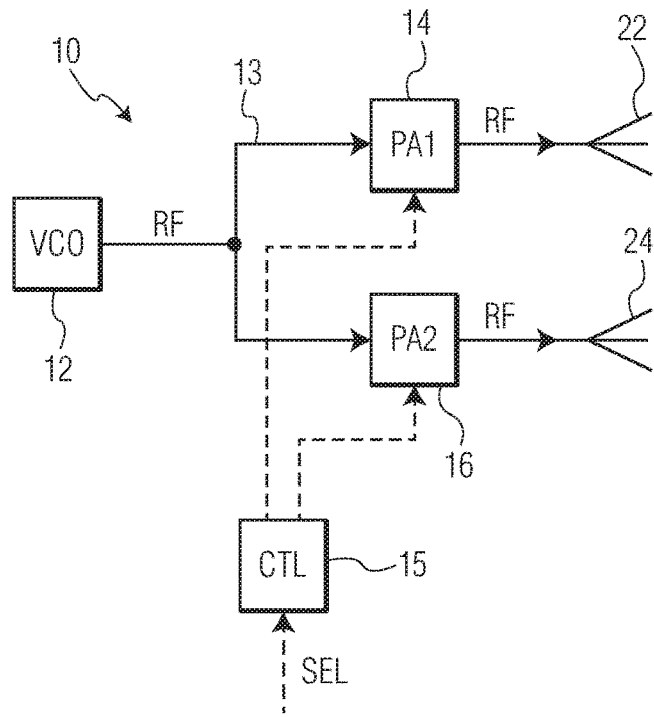
FIG. 1 schematically shows an example of an embodiment of a radar transmitter device.
Figure 2:
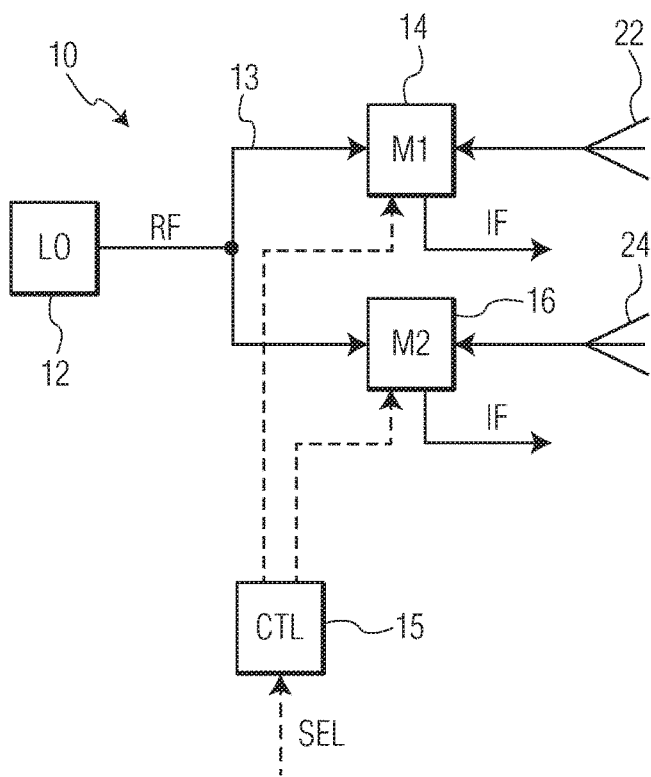
FIG. 2 schematically shows an example of an embodiment of a radar receiver device.
Figure 3:
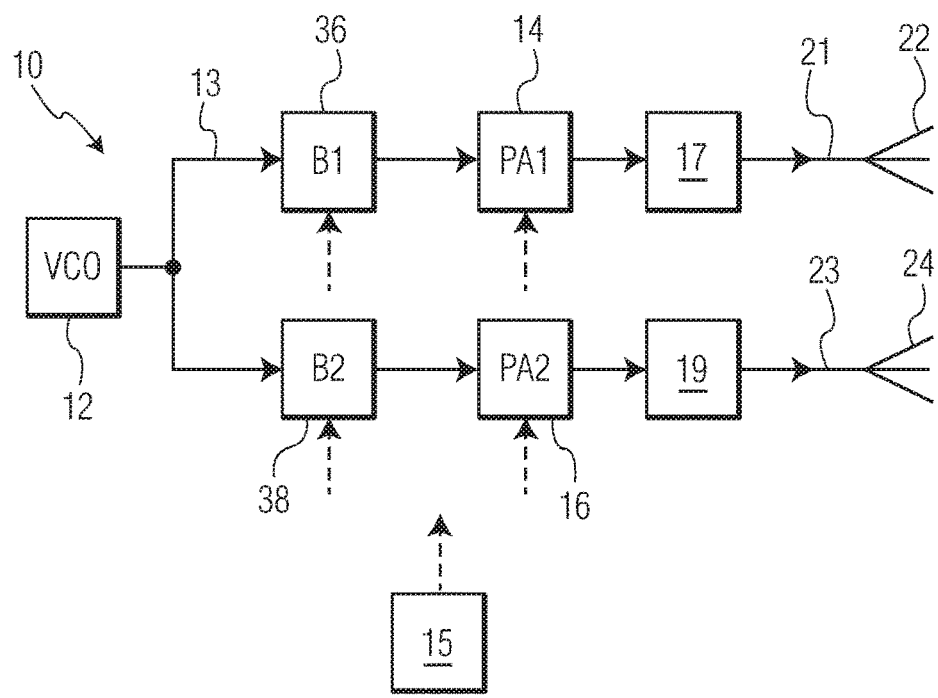
FIG. 3 schematically shows another example of an embodiment of a radar transmitter device.

FIG. 3 schematically shows an example of a radar device 10. The radar device 10 comprises a radar frequency signal source 12, two or more antenna interface units 22, 24, a feed network 13, and a control unit 15. The radar frequency signal source may be arranged to provide a radar frequency signal, e.g., one of the following: a signal to be amplified and transmitted or a local oscillator signal. In the present example, the radar device 10 comprises two antenna interface units, namely the group of components 14, 21, 22 (first antenna interface unit) and the group of components 16, 23, 24 (second antenna interface unit). The radar device 10 may be a radar transmitter device or a radar receiver device.

When the radar device 10 is a radar transmitter device, each of the antenna interface units may comprise, e.g., an antenna port and an amplifier arranged to amplify the radio frequency signal and to provide it to the antenna port. In the present example, the first antenna interface unit 14, 21, 22 may thus comprise, for example, a first amplifier 14, a first antenna port 21, and a first transmission antenna 22. The second antenna interface unit may comprise, for example, a second power amplifier 16, a second antenna port 23, and a second transmission antenna 24.

When the radar device 10 is a radar receiver device, each of the antenna interface units may comprise, for example, an antenna port and a mixer. The mixer may be arranged to generate an intermediate frequency signal by mixing the radar frequency signal with a reception signal received via the antenna port. For example, the first antenna interface unit 14, 21, 22 may comprise a first mixer 14, a first antenna port 21, and a first reception antenna 22, while the second antenna interface unit 16, 23, 24 may comprise a second mixer 16, a second antenna port 23, and a second reception antenna 24. The antennas may alternatively be considered external to the antenna interface units. Each antenna interface unit may further comprise a balun 17, 19 connected between, e.g., the amplifier or mixer and the corresponding antenna port.

The units 14 and 16 may thus be either amplifiers or mixers. Similarly, the units 22 and 24 may be either transmission antennas or reception antennas.

The feed network 13 may comprise two or more buffers. In the shown example, the feed network 13 comprises a first buffer 36 and a second buffer 38. Each buffer may have an active state and an inactive state. When the buffer is in its active state, it is transmissive for the radar frequency signal from, e.g., the radar frequency signal source 12. In contrast, when the buffer is in its inactive state, it is substantially non-transmissive for the radar frequency signal. Each of the buffers 36, 38, thus, has an on-state in which it is arranged to transfer the radar frequency signal to the respective antenna interface unit and an off-state in which it is arranged to block the radar frequency signal.

The control unit 15 may be arranged to generate or receive a selection signal, which specifies none, one, or more of the antenna interface units as active antenna interface units and the remaining none, one, or more antenna interface units as inactive antenna interface units. The control unit may further activate and deactivate the buffers 36 and 38 in dependence on the selection signal so as to feed the radar frequency signal to the none, one, or more active antenna interface units and not to the none, one, or more inactive antenna interface units. For example, in order to feed the radar frequency signal from the signal source 12 to the first antenna interface unit 14, 21, 22, the control unit 15 may activate the first buffer 36 and deactivate the second buffer 38. The power suppression between the first antenna interface unit 14, 21, 22, and the second antenna interface unit 16, 23, 24 can thus be dramatically improved.

Figure 4:
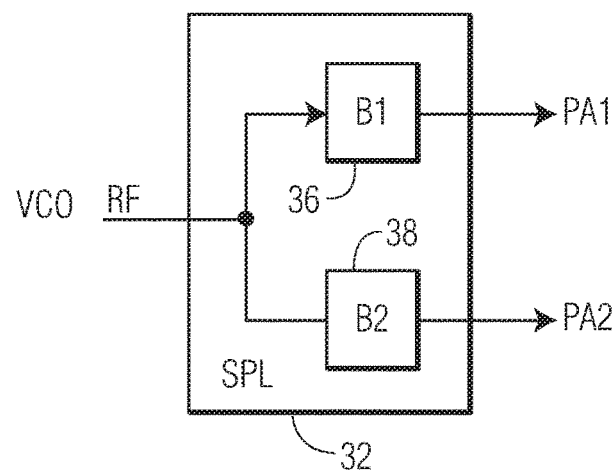
FIG. 4 schematically shows an example of an embodiment of a splitter unit.

Referring now to FIG. 4, the buffers may be arranged in one or more pairs of buffers. Each pair may form a splitter unit. For instance, a splitter unit 32 may be formed of the buffers 36 and 38, shown in FIG. 3. In an example in which the radar device 10 comprises more than only two antennas, the radar device may comprise more than two buffers and more than one splitter unit.

Figure 5:
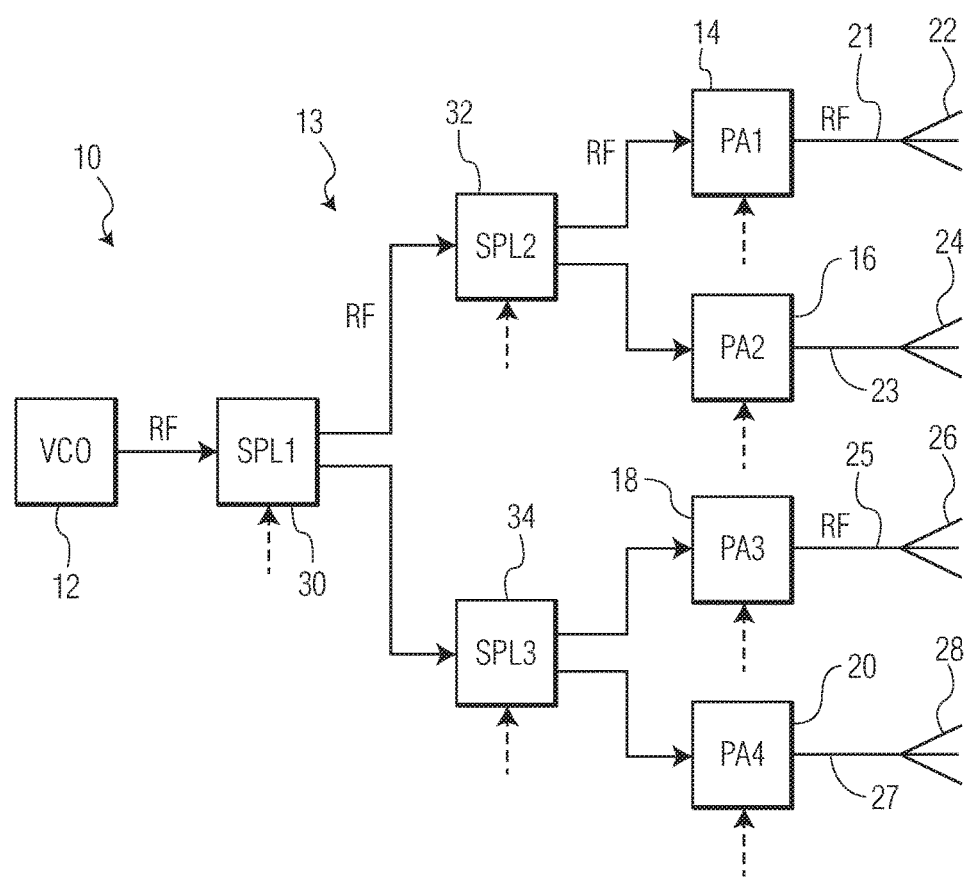
FIG. 5 schematically shows another example of an embodiment of a radar transmitter device.

The splitter units may be connected to form a binary tree. The binary tree may have two or more levels. Indeed, a multi-level tree may result in a more effective power suppression. A level or hierarchy level of the tree may be defined as a group of nodes connected to the top of the tree via the same number of intermediary nodes. An example of a radar device 10 with a feed network 13 arranged as a binary tree is schematically shown in FIG. 5. A binary tree is a network in which each node has two child nodes. In the present example, the nodes may be seen in the splitter units 30, 32, and 34. The splitter units 32, 34 may be considered child nodes of the splitter unit 30. More specifically, each of the splitter units of this example has one input and two outputs, with the two outputs of the splitter unit 30 connected to the input of the splitter unit 32 and the input of the splitter unit 34. Each of the splitter units 30, 32, and 34 may be controlled by the control unit 15 (not shown in this Figure), so as to route the radar frequency signal from the signal source 12 to the selected antenna interface units. In the shown example, the radar device 10 comprises a first antenna interface unit 14, 21, 22, a second antenna interface unit 16, 23, 24, a third antenna interface unit 18, 25, 26, and a fourth antenna interface unit 20, 27, 28 as shown, wherein each of the blocks 14, 16, 18, and 20 may either be an amplifier (when the radar device 10 is a transmitter device) or a mixer (when the radar device 10 is a receiver device). The numerals 21, 23, 25, and 27 indicate the antenna ports connected or connectable to the corresponding antennas 22, 24, 26, and 28. For example, in order to route the radar frequency signal from the signal source 12 to the third antenna interface unit 18, 25, 26, the first splitter unit 30 may be controlled to output the radar frequency signal only at its output connected to the third splitter unit 34 and not at its output connected to the second splitter unit 32. Similarly, the third splitter unit 34 may be controlled to output the radar frequency signal only at its output connected to the third antenna interface unit 18, 25, 26, and not at its output connected to the fourth antenna interface unit 20, 27, 28. The splitter discussed above may, alternatively, be arranged with three or four outputs. However, this may result in an inferior power suppression performance.

In an alternative embodiment (not shown), each of the antenna interface units may be provided with its own buffer, as suggested by FIG. 3 described above. A tree structure as described by considering the example of FIG. 5 however may allow for a more efficient suppression of crosstalk by using a number of small buffers (small devices and low current). This is explained by the fact that every splitter unit of the binary tree, except the splitter units at the lowest hierarchal level of the tree (splitter units 32 and 34 in the present example) are associated with more than two antenna interface units. For example, the splitter unit 30 (at the top level of the binary tree) is in the present example used for the four antenna interface units associated with the four antennas 22, 24, 26, and 28.

Figure 6:
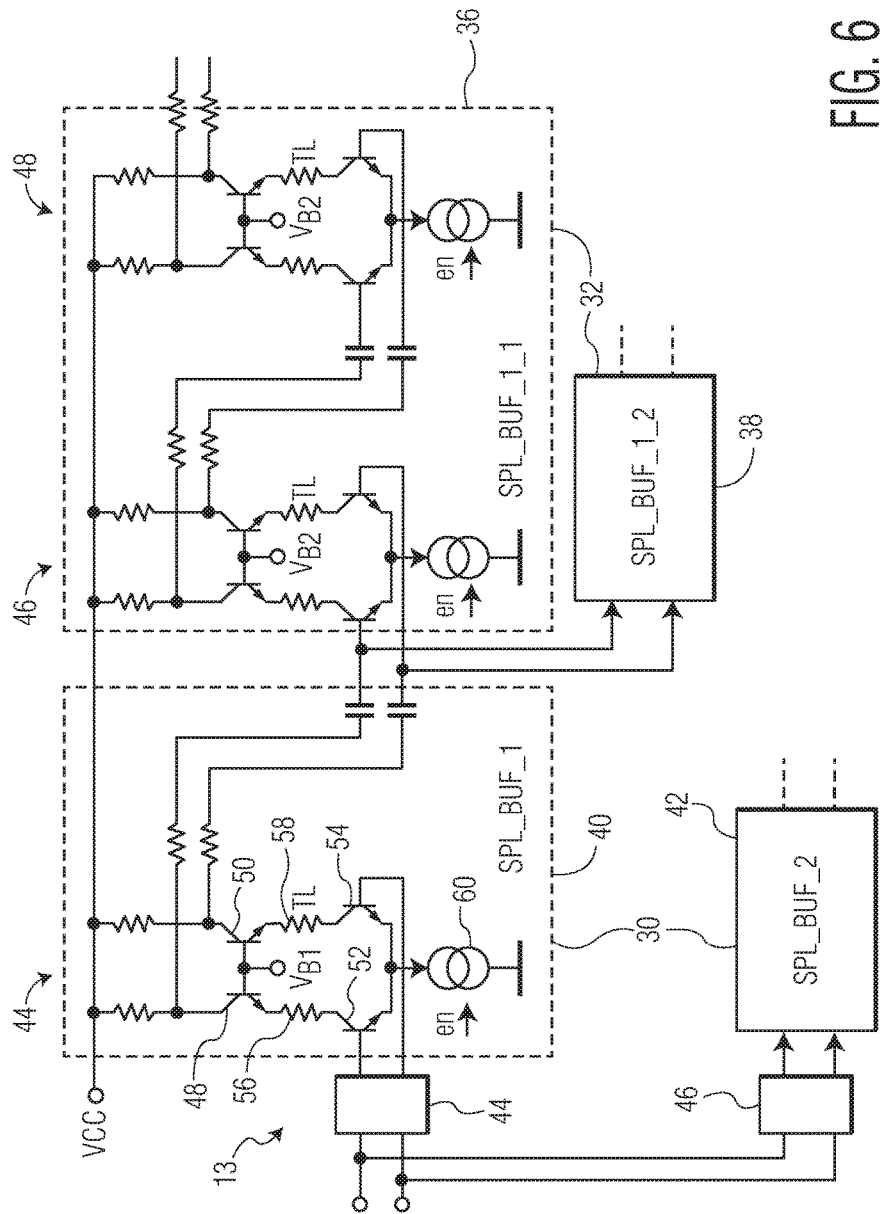
FIG. 6 schematically shows an example of an embodiment of a feed network.

Referring now to FIG. 6, an example of the feed network 13 shown in FIG. 5 is described. Only the splitter units 30 and 32 are shown for the sake of clarity. In the present example, these two splitter units are located at different hierarchal levels of the binary tree and may therefore be designed differently while still allowing for a design that is symmetric relative to a permutation of the "tuple" of antenna interface units. In the present example, the first splitter unit 30 comprises a first buffer 40 and a second buffer 42. The buffers 40 and 42 may be identical. The buffers 40 and 42 may be connected to the radar frequency signal source 12, e.g., via matching networks 44 and 46. The buffer 40 may be provided by a cascode 44. The cascode 44 may comprise a pair of common-base bipolar transistors 48 and 50 and a pair of common-emitter bipolar transistors 52 and 54. The emitters of the transistors 48 and 50 may be directly connected to the collectors of the transistors 52 and 54. In the present example, the emitters of transistors 48, 50 are connected to the collectors of transistors 52, 54 via long transmission lines 56, 58 which are required due to the radar antenna arrangement. The transmission lines 56 and 58 may have lengths that are great in comparison to the wavelength (e.g., a few millimeters) of the radar frequency signal on the chip. A transmission line, which may be required anyway for connecting the signal source 12 to the respective antenna interface unit, may thus be incorporated conveniently in the buffer 40 with a minimum impact on the signal loss.

The common emitters of the transistors 52 and 54 may be driven by a current source 60. The current source 60 may be enabled (energized or activated) and disabled (de-energized or deactivated) by means of the control unit 15. The buffer 40 may thus be switched on and off by means of the control unit 50. By switching the buffer 40 on and the buffer 42 off, the signal may be routed from the signal source 12 via the matching network 44 through the buffer 40 and into the splitter unit 32.

The splitter unit 32 may comprise, e.g., a first buffer 36 and a second buffer 38. The buffers 36 and 38 may be identical, thus treating the antenna interface units connected to them on an equal footing. In the present example, the buffer 36 comprises a first cascode 46 and a second cascode 48 connected in series. Each of the cascodes 46 and 48 may be similar in design as the cascode 44 described above. Notably, each of the cascodes may comprise a long transmission line. Furthermore, the buffer 36 may be enabled and disabled by enabling and disabling the current sources of the cascodes 46 and 48, using, e.g., the control unit 15.

The splitter units 30, 32, 34 being active units, they may, in addition to reducing crosstalk between the antenna interface units, compensate for possible losses between the signal source 12 and the antenna interface units.

Figure 7:
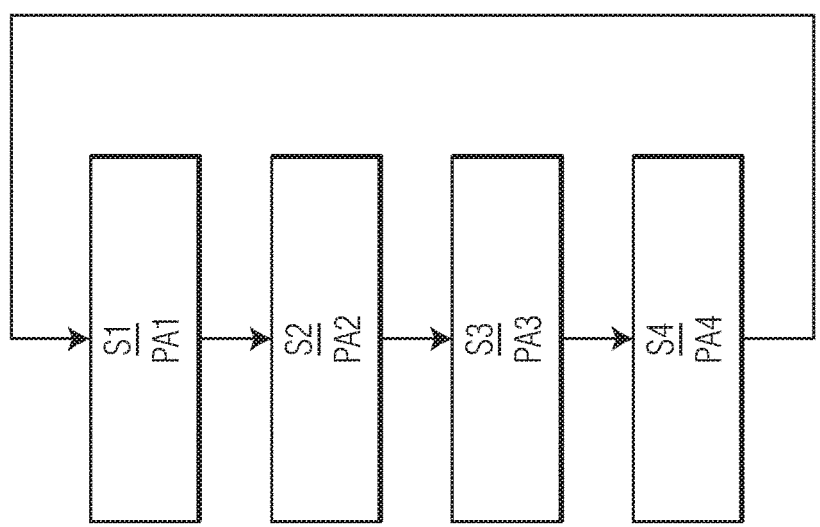
FIG. 7 shows a flowchart of an example of an embodiment of a method of operating a radar device.

Referring now to FIG. 7, an example of a method of operating a radar device is described. The method is explained in reference to the radar device 10 shown in FIG. 5, but may be generalized to a radar device 10 that comprises fewer or more antenna interface units.

In a first phase S1, the first amplifier 14 may be switched on, and the remaining amplifiers 16, 18, 20, may be switched off. Accordingly, the splitter units 30 and 32 may be controlled to route the radar frequency signal from the signal source 12 only to the first power amplifier 14. In a subsequent phase S2, the second power amplifier 16 may be switched on while the remaining power amplifiers 14, 18, 20 may be switched off. Accordingly, the splitter units 30 and 32 may be controlled to route the radar frequency signal from the signal source 12 to only the second amplifier 16. In a subsequent phase S3, the third amplifier 18 may be turned on and the remaining amplifiers may be switched off. Accordingly, the splitter units 30 and 34 may be controlled to route the radar frequency signal from the signal source 12 to only the third amplifier 18. Finally, in phase S4, the fourth amplifier 20 may be switched on, and the other amplifiers 14, 16, and 18 may be switched off. Accordingly, the splitter units 30 and 34 may be controlled to route the radar frequency signal from the signal source 12 to only the fourth amplifier 20. An effective suppression of output power at every antenna, except the active one, may thus be achieved. The sequence in FIG. 7 could be arranged in other ways, e.g., only two or three channels may be controlled in the loop.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Also, for example, in one embodiment, the illustrated elements of system 10 are circuitry located on a single integrated circuit or within a same device. Alternatively, system 10 may include any number of separate integrated circuits or separate devices interconnected with each other. For example, signal source 35 may be located on a same integrated circuit as amplifiers or mixers 12 and 14 or on a separate integrated circuit or located within another peripheral or slave discretely separate from other elements of system 10. The control unit 15 may also be located on separate integrated circuits or devices. Also, for example, the system 10 or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, devices functionally forming separate devices may be integrated in a single physical device. For example, the antennas 21, 24, 26, 28 may be part of the radar device 10. Alternatively, they may be connectable to the radar device 10.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A radar device comprising: a radar frequency (RF) signal source; two or more antenna interface units; a feed network; and a control unit, wherein
the RF signal source is arranged to provide an RF signal;
each of the antenna interface units comprises an antenna port and one of the following: an amplifier and a mixer; wherein the amplifier is arranged to amplify the RF signal and to provide it to the antenna port and the mixer is arranged to generate an intermediate frequency signal by mixing the RF signal with a reception signal received via the antenna port;
the feed network comprises two or more buffers, each buffer has an active state, in which the buffer is transmissive for the RF signal, and an inactive state, in which the buffer is substantially nontransmissive for the RF signal;
each of the buffers comprises two or more cascodes connected in series for transferring the RF signal; and
the control unit is arranged to switch each of the buffers to one of the active state and the inactive state in dependence on a selection signal, wherein the selection signal specifies none, one, or more of the antenna interface units as active antenna interface units and the remaining none, one, or more antenna interface units as inactive antenna interface units, and wherein a first one of the buffers is arranged to feed the RF signal to a first respective one of the active antenna interface units when the first buffer is switched to the active state, others of the buffers block the feed of the RF signal to the inactive antenna interface units when the other buffers are switched to the inactive state, and the control unit is further arranged to switch the first buffer to the active state by energizing the respective two or more cascodes and to switch the other buffers to the inactive state by deenergizing the respective two or more cascodes.

2. The radar device of claim 1, wherein the buffers are arranged in one or more pairs of buffers, each pair forming a splitter unit.

3. The radar device of claim 2, wherein the two buffers in each splitter unit are identical.

4. The radar device of claim 3, wherein the splitter units are connected to form a binary tree having two or more levels.

5. The radar device of claim 4, wherein the splitter units at a same level of the two or more levels within the binary tree are identical.

6. The radar device of claim 1, wherein each of the antenna interface units comprises the amplifier but not the mixer.

7. The radar device of claim 1, wherein each of the antenna interface units comprises the mixer but not the amplifier.

8. The radar device of claim 1, wherein each of the buffers comprises a transmission line having a length that is greater than a wavelength of the RF signal.

9. The radar device of claim 1, wherein each of the cascodes comprises the following components connected in series in this order: a first bipolar transistor, a transmission line, and a second bipolar transistor.

10. The radar device of claim 1, wherein each of the antenna interface units further comprises a balun connected between the antenna port and the power amplifier or mixer.

11. A method of operating a radar device comprising a radar frequency (RF) signal source, two or more antenna interface units, and a feed network, wherein
the RF signal source provides an RF signal;
each of the antenna interface units comprises an antenna port and one of the following: an amplifier and a mixer; wherein the amplifier is arranged to amplify the RF signal and to provide it to the antenna port and the mixer is arranged to generate an intermediate frequency signal by mixing the RF signal with a reception signal received via the antenna port;
the feed network comprises two or more buffers; each buffer has an active state, in which the buffer is transmissive for the RF signal, and an inactive state, in which the buffer is substantially nontransmissive for the RF signal;
each of the buffers comprises two or more cascodes connected in series for transferring the RF signal;
and the method comprises:
switching a first one of the buffers to the active state in dependency upon a selection signal, wherein the selection signal specifies none, one, or more of the antenna interface units as active antenna interface units and the remaining none, one, or more antenna interface units as inactive antenna interface units, and wherein the first buffer is arranged to feed the RF signal to a first respective one of the active antenna interface units when the first buffer is switched to the active state, and wherein switching the first buffer to the active state comprises energizing the respective two or more cascodes, and
switching others of the buffers to the inactive state in dependency upon the selection signal, wherein the other buffers block the feed of the RF signal to the inactive antenna interface units when the other buffers are switched to the inactive state, and wherein switching the other buffers to the inactive state comprises deenergizing the respective two or more cascodes.

* * * * *